(12) United States Patent
Singwi et al.

(10) Patent No.: US 12,250,126 B2
(45) Date of Patent: Mar. 11, 2025

(54) DISCOVERING AND ONBOARDING EDGE DEVICES

(71) Applicant: VMware LLC, Palo Alto, CA (US)

(72) Inventors: Raunak Ravindra Singwi, Pune (IN); Daniel James Beveridge, Valrico, FL (US); Erol Aygar, Maynard, MA (US); Sairam Veeraswamy, Coimbatore (IN)

(73) Assignee: VMware LLC, Palo Alto, CA (US)

( * ) Notice: Subject to any disclaimer, the term of this patent is extended or adjusted under 35 U.S.C. 154(b) by 49 days.

(21) Appl. No.: 18/202,434

(22) Filed: May 26, 2023

(65) Prior Publication Data

US 2024/0396804 A1   Nov. 28, 2024

(51) Int. Cl.
*G06F 15/173* (2006.01)
*H04L 41/122* (2022.01)

(52) U.S. Cl.
CPC .................................. *H04L 41/122* (2022.05)

(58) Field of Classification Search
CPC .... H04L 41/122; H04L 41/16; H04L 41/0893
See application file for complete search history.

(56) References Cited

U.S. PATENT DOCUMENTS

| 11,637,753 | B1 * | 4/2023 | Wang | H04L 41/0893 |
| | | | | 709/223 |
| 11,792,086 | B1 * | 10/2023 | Singwi | H04L 41/0897 |
| | | | | 709/226 |
| 2021/0036987 | A1 * | 2/2021 | Mishra | H04L 61/2592 |
| 2023/0134539 | A1 | 5/2023 | Wang et al. | |

OTHER PUBLICATIONS

Extended European Search Report, European Application No. 24177985.9 dated Oct. 31, 2024, 10 pages.
Anonymous: "VMware SD-WAN Administration Guide 5.1—first 400 pages", 2022, XP093215175, Retrieved from the Internet: URL: https://docs.vmware.com/en/VMware-SD-WAN/5.1/VMware-SD-WAN-Administration-Guide.pdf, 400 pages.
Anonymous: "VMware SD-WAN Administration Guide 5.1—pp. 401-800", 2022, XP093215197, Retrieved from the Internet: URL: https://docs.vmware.com/en/VMware-SD-WAN/5.1/VMware-SD-WAN-Administration-Guide.pdf, 400 pages.

(Continued)

*Primary Examiner* — John B Walsh
(74) *Attorney, Agent, or Firm* — King Intellectual Asset Management

(57) ABSTRACT

Solutions for discovering and onboarding edge devices at scale include: receiving, by a device aggregator, edge device state information including state information for a first edge device; based on at least the state information for the first edge device, configuring the first edge device to perform as a software-defined wide area network (SD-WAN) node; based on at least the edge device state information, determining a first device profile for the first edge device; and transmitting the first device profile to a workload manager. In some examples, the edge device state information includes state information for a second edge device; the second edge device is configured to perform as an SD-WAN node; and a second device profile is determined for the second edge device and transmitted to the workload manager. The workload manager allocates an SD-WAN workload among the first edge device and the second edge device.

20 Claims, 6 Drawing Sheets

(56) References Cited

OTHER PUBLICATIONS

Anonymous: "VMware SD-WAN Administration Guide 5.1—pp. 801-1200", 2022, XP093215216, Retrieved from the Internet: URL: https://docs.vmware.com/en/VMware-SD-WAN/5.1/VMware-SD-WAN-Administration-Guide.pdf, 400 pages.
Troia Sebastian et al: "SD-WAN: how the control of the network can be shifted from core to edge", 2021 International Conference On Optical Network Design and Modeling (ONDM), IFIP TC6 WG6. 10, Jun. 28, 2021, pp. 1-3, XP033948205, Doi: 10.23919/ONDM51796. 2021.9492375 [retrieved on Jul. 20, 2021], 3 pages.

* cited by examiner

DISCOVERING AND ONBOARDING EDGE DEVICES

BACKGROUND

Wide-area networks (WANs) connect users to distributed resources, and a software-defined approach to managing WAN produces a software-defined WAN (SD-WAN). The combination of infrastructure-as-a-service (IaaS) and edge devices produces distributed edge cloud services using multiple edge devices provided by various edge device providers/aggregators. The various edge devices may have differing specifications, configurations, primary functions, and tenancy profiles across multiple geographical locations.

Additionally, the various providers/aggregators may expose their edge device resources differently. Further, edge device availability may change over time, and different edge devices may have different periods of unavailability (e.g., due to varying update cadence and schedule). These scenarios may produce a heterogeneous edge cloud, in which all of the edge cloud devices are not fully standardized. The differences among the devices render efficient provision and management of heterogeneous edge clouds challenging.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide solutions for discovering and onboarding edge devices at scale. Examples include: receiving, by a device aggregator, edge device state information, the edge device state information including state information for a first edge device: based on at least the state information for the first edge device, configuring the first edge device to perform as a software-defined wide area network (SD-WAN) node: based on at least the edge device state information, determining a first device profile for the first edge device, the first device profile indicating availability of the first edge device to perform as an SD-WAN node; and transmitting the first device profile to a workload manager. In some examples, the edge device state information includes state information for a second edge device: the second edge device is configured to perform as an SD-WAN node; and a second device profile is determined for the second edge device and transmitted to the workload manager. The workload manager allocates an SD-WAN workload among the first edge device and the second edge device.

BRIEF DESCRIPTION OF THE DRAWINGS

The present description will be better understood from the following detailed description read in the light of the accompanying drawings, wherein.

Any of the figures may be combined into a single example or embodiment.

DETAILED DESCRIPTION

Aspects of the disclosure provide solutions for discovering and onboarding edge devices at scale. Examples include: receiving, by a device aggregator, edge device state information including state information for a first edge device: based on at least the state information for the first edge device, configuring the first edge device to perform as a software-defined wide area network (SD-WAN) node: based on at least the edge device state information, determining a first device profile for the first edge device, the first device profile indicating availability of the first edge device to perform as an SD-WAN node; and transmitting the first device profile to a workload manager. In some examples, the edge device state information includes state information for a second edge device: the second edge device is configured to perform as an SD-WAN node; and a second device profile is determined for the second edge device and transmitted to the workload manager. The workload manager allocates an SD-WAN workload among the first edge device and the second edge device.

Aspects of the disclosure are able to improve efficiency of computing operations by customizing edge device registration in view of state information for each edge device. This prevents resource constraints, such as, for example, shifting workload among edge devices based on device-specific state information (e.g., maintenance schedules and primary functions). This is accomplished, at least in part by, based on at least the state information for the first edge device, configuring the first edge device to perform as an SD-WAN node. Further, a second edge device is configured to perform as an SD-WAN node, based on at least the state information for the second edge device, configuring the second edge device to perform as an SD-WAN node. This provides customization for the edge devices.

For example, workload can be shifted away from edge devices that have virtual network functions (VNFs) as their primary function, due to the potential for resource contention, and workload can also be shifted away from devices with a looming update and reboot, toward a device for which maintenance actions are not anticipated for some time period. Without such a mechanism for ensuring custom registration for the edge devices, edge clouds would suffer from unnecessary resource contention and performance degradation as workload is sent to overly-burdened edge devices even while other edge devices remained underutilized. Thus, aspects of the disclosure provide a practical, useful result to solve a technical problem in the domain of computing.

Figure 1:
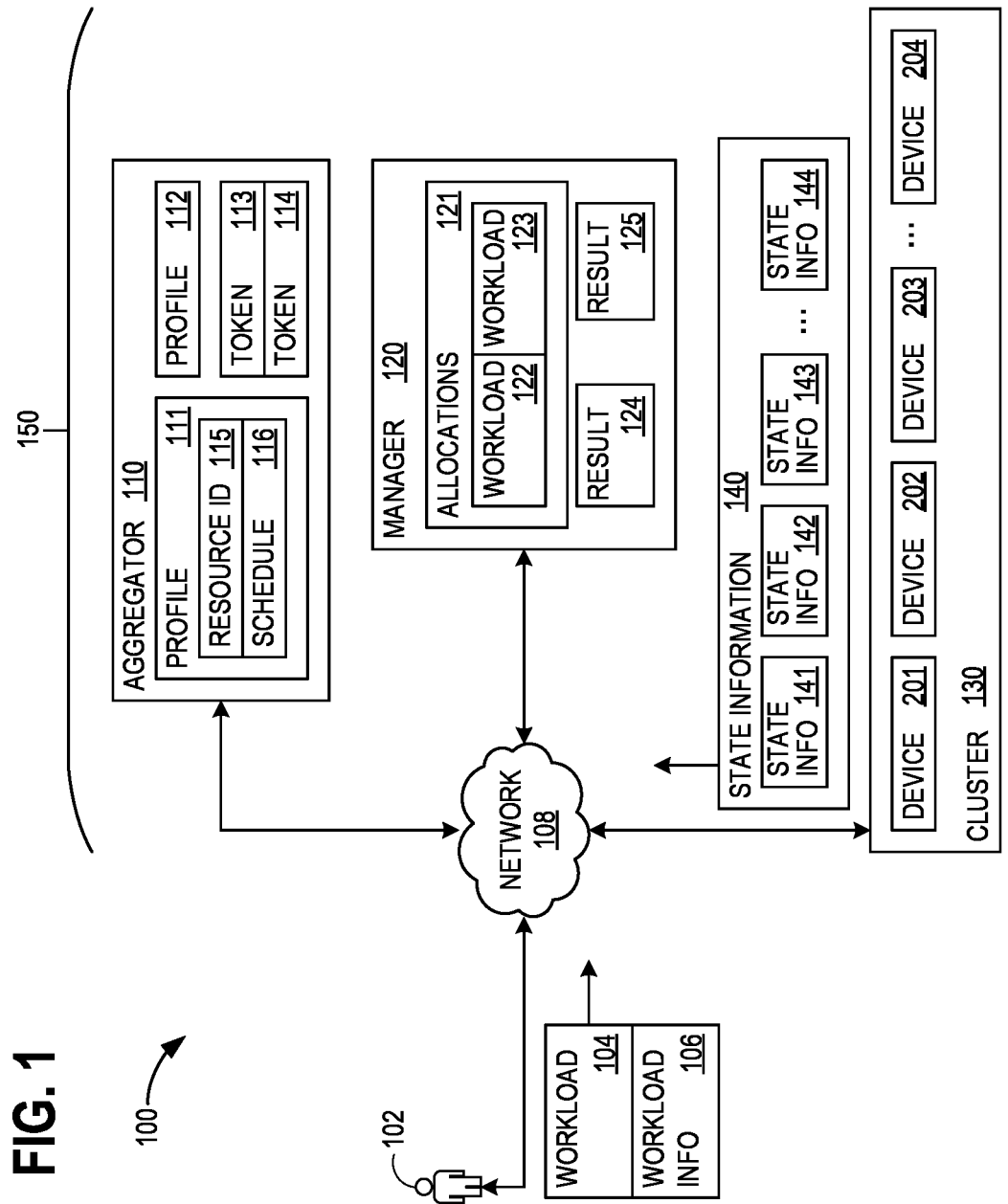
FIG. 1 illustrates an example architecture that advantageously discovers and onboards edge devices at scale.

FIG. 1 illustrates an example architecture 100 in which a user 102 leverages an SD-WAN hosted workload cluster 150 (e.g., an edge cloud) across a computer network 108 to perform an SD-WAN workload 104, which is a workload hosted by an SD-WAN device. That is, SD-WAN workload 104 is allocated to run on a device hosting SD-WAN as a primary function, rather than a generic function overlaid on SD-WAN infrastructure. SD-WAN hosted workload cluster 150 comprises a device aggregator 110, a workload manager 120, and a computational cluster 130. Device aggregator 110 identifies edge devices having spare resources to be repurposed for on demand hosting of domain specific edge services or applications (for example, to provide cloud services), and onboards them with workload manager 120. Workload manager 120 then allocates SD-WAN workload 104 among the registered edge devices, collects the results, and returns the results to user 102.

To onboard edge devices, device aggregator 110 discovers heterogeneous edge devices, such as edge devices 201-204 that can make spare resources available, and adds them to computational cluster 130. Device aggregator 110 and/or workload manager 120 bootstraps a container orchestration platform (e.g., resource management software 220 of FIG. 2) on edge devices 201-204; securely onboards edge devices 201-204 (e.g., by using a token 113 for edge device 201, a token 114 for edge device 202, etc.) thereby integrating them into SD-WAN hosted workload cluster 150; deploys containerized workloads on edge devices 201-204; monitors status and service level agreement (SLA) for the containerized workloads; and manages fail-over and load balancing of the containerized workloads when an SLA breach occurs.

Device aggregator 110 receives edge device state information 140, which includes state information 141 for edge device 201, state information 142 for edge device 202, state information 143 for edge device 203, and state information 144 for edge device 204. State information contains information relevant to whether a particular edge device has resources available, such as its primary function 210, its maintenance schedule 212, and its compute resources 230 (e.g., count of processing cores). See FIG. 2 for further detail on compute resources 230 and edge devices. Although only four edge devices are shown in the example architecture 100, and architecture 100 is described primarily in relation to edge devices 201 and 202, it should be understood that a larger number of edge devices may be onboarded and used, in some examples.

Device aggregator 110 uses edge device state information 140 to generate device profiles for each edge device to be onboarded, such as a device profile 111 for edge device 201 and a device profile 112 for edge device 202. Device profile 111 has resource identification information 115 to identify which of compute resources 230 of edge device 201 are available for use by workload manager 120, along with a schedule 116 of when the identified compute resources are available. Device profile 112 has equivalent information for edge device 201. Device profiles 111 and 112 are each custom to their respective one of edge devices 201 and 202. Device aggregator 110 transmits device profiles 111 and 112 to workload manager 120 as part of the onboarding process. Device profiles 111 and 112 indicate to workload manager 120 the availability of a respective one of edge devices 201 and 202 to perform as SD-WAN nodes (e.g., which resource are available as indicated in resource identification information 115 and when those resources are available, as indicated in schedule 116).

Workload manager 120 may be co-located with device aggregator 110 or may instead be separated across computer network 108. Computer network 108 may be the internet, another wide area network (WAN), a local area network (LAN), a private network, a public network, or some combination.

Workload manager 120 acts as a hub for simplified, multi-cloud, multi-cluster management from a single control point. This permits users to deploy and operate containerized applications across multiple clouds and clusters. Workload manager 120 permits users to see clusters and namespaces, and organize them into logical groups for management of resources, applications (apps), and security.

Workload manager 120 uses received device profiles 111 and 112, along with workload information 106 (e.g., task and scheduling information) to intelligently allocate SD-WAN workload 104 among the available edge devices. For example, workload manager 120 generates workload allocations 121 that identifies a workload 122 for edge device 201 and a workload 123 for edge device 202. Workloads 122 and 123 may be compute tasks, in some examples. Upon completing their assigned workload, edge device 201 returns result 124 of workload 122 and edge device 202 returns result 125 of workload 123. Some examples provide ongoing progress reporting, and results 124 and 124 may be intermediate results until workloads 122 and 123 are completed. Workload manager 120 forwards results 124 and 124 to user 102 as requested by user 102.

Although only a single computational cluster 130 is shown, it should be understood that SD-WAN may have multiple computational clusters 130. Clustering container groups allows aligning resources to specific business units and setting different policies for each cluster. For example, different business units may be allocated different resources levels and have different policies regarding security and data management, such as access to personally identifiable information (PII), financial information, proprietary information, and other sensitive data. In some examples, computational cluster 130 comprises a Kubernetes cluster.

Onboarding edge devices 201-204 includes discovering each device, and configuring each device to execute software that enables the device to perform as a node of SD-WAN hosted workload cluster 150, without negatively impacting the device's core function. Leaving configuration up to a manual process not only introduces the risk of human error introducing security and performance issues, but the number of edge devices becomes so large that manual configuration cannot keep up with changes to edge device state information 140. Additionally, since, in general, edge devices 201-204 should be expected to have different specifications and configurations (e.g., be heterogeneous), even an initial manual configuration may be untenable in many scenarios.

Figure 2:
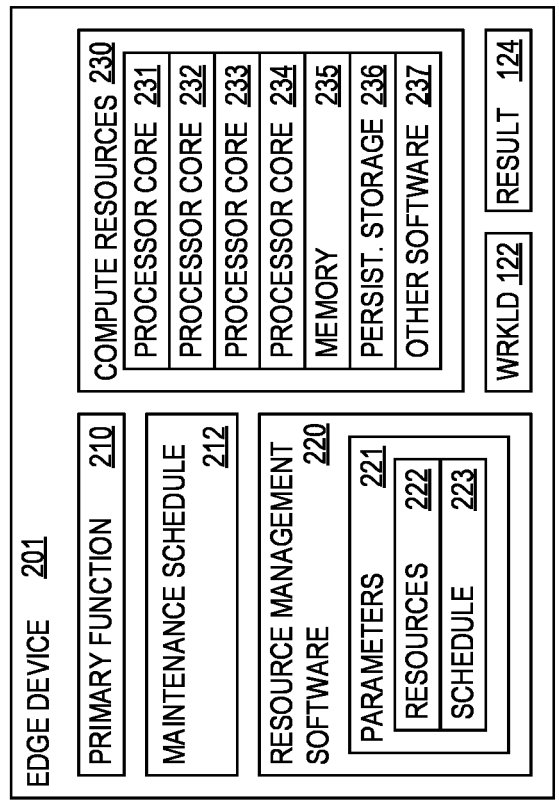
FIG. 2 illustrates an example edge device that may be used in an example architecture such as that of FIG. 1.

FIG. 2 shows further detail for edge device 201. The architecture of edge devices 202-204 may be similar, although implementation details may differ from those of edge device 201 and each other. In some examples, each of edge devices 202-204 is implemented as a computing apparatus 618 of FIG. 6. Edge device 201 performs primary function 210, which may involve some specific application software, but has surplus capacity to contribute for use as a SD-WAN node.

In some example, primary function 210 may be a VNF, or else edge device 201 has a VNF as a secondary function. Example VNFs include network functions such as directory services, domain name systems (DNS), routers, firewalls, load balancers, caches, network address translation (NAT), and others. VNFs move network and network security functions, which had previously been implemented using dedicated hardware devices, into software that runs on commodity hardware. However, due to the bursty operation of VNFs, edge devices running VNFs may be excluded by policy from onboarding into SD-WAN hosted workload cluster 150.

In the illustrated example, however, edge device 201 is being onboarded. Edge device sends its state information 141 which, in some examples, includes its maintenance schedule 212 and available compute resources 230 to device aggregator 110, either directly, or through some intermediary. This enables device aggregator 110 to generate device profile 111 so that workload manager 120 is able to use edge device 201 without adversely impacting primary function 210.

Figure 6:
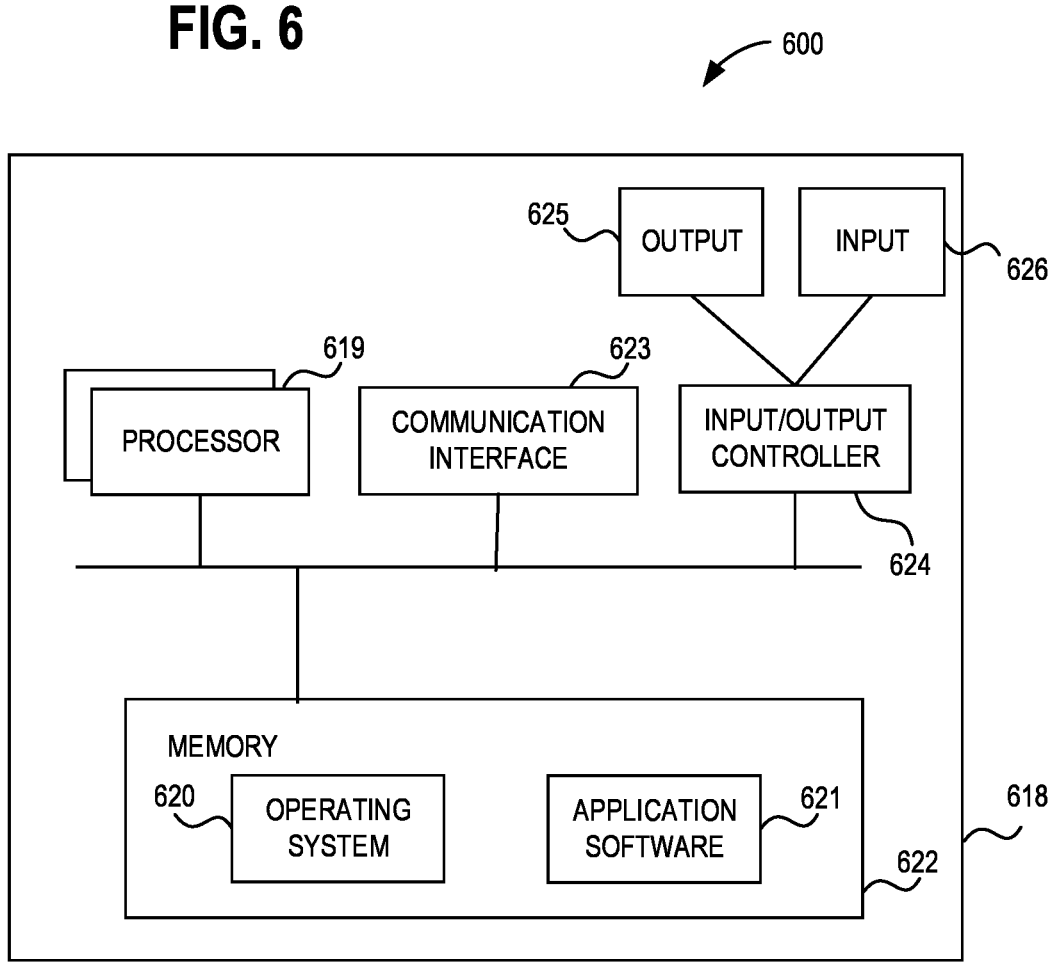
FIG. 6 illustrates a block diagram of an example computing apparatus that may be used as a component of an example architecture such as that of FIG. 1.

In the illustrated example, edge device 201 has four processor cores 231-234, each of which is equivalent to processor 619 of computing apparatus 618 in FIG. 6. Edge device 201 is also shown as having a memory 235 (see memory 622 of FIG. 6), a persistent storage 236, and other software 237 for possible additional functionality. In some examples, primary function 210, resource management software 220, and other software 237 are included within application software 621 of FIG. 6.

In some examples, processor core 231 and processor core 232 are used to execute primary function 210, leaving processor core 233 and processor core 234 available for executing workload 122 to generate result 124. In some examples when workload manager 120 pushes workload 122 to edge device 201, workload 122 includes both necessary software and data to execute workload 122. In some examples, the software necessary to execute workload is included within other software 237.

Maintenance schedule 212 includes predicted patch, update, and reboot events, and by including maintenance schedule within state information 141, device aggregator 110 can avoid scheduling edge device 201 for SD-WAN activity during times when edge device 201 has less capacity for SD-WAN activity. This prevents delays and performance issues with SD-WAN hosted workload cluster 150 providing services to user 102.

Device aggregator 110 pushes resource management software 220 to edge device 201 and configures edge device 201 to perform as an SD-WAN node by configuring execution parameters 221 for resource management software 220. Execution parameters 221 are customized for edge device 201 in view of maintenance schedule 212 and/or compute resources 230 available for edge cloud support. In some examples, execution parameters 221 includes an identification of resources 222 to use out of compute resources 230, and a schedule 223 of when edge device 201 should make resources 222 available. Schedule 223, and equivalents on edge devices 202-204, provide part of the capability of architecture 100 to move SD-WAN workload 104 around among edge devices 201-204 to maintain efficient operation with minimal interruptions and improved resiliency.

Figure 3:
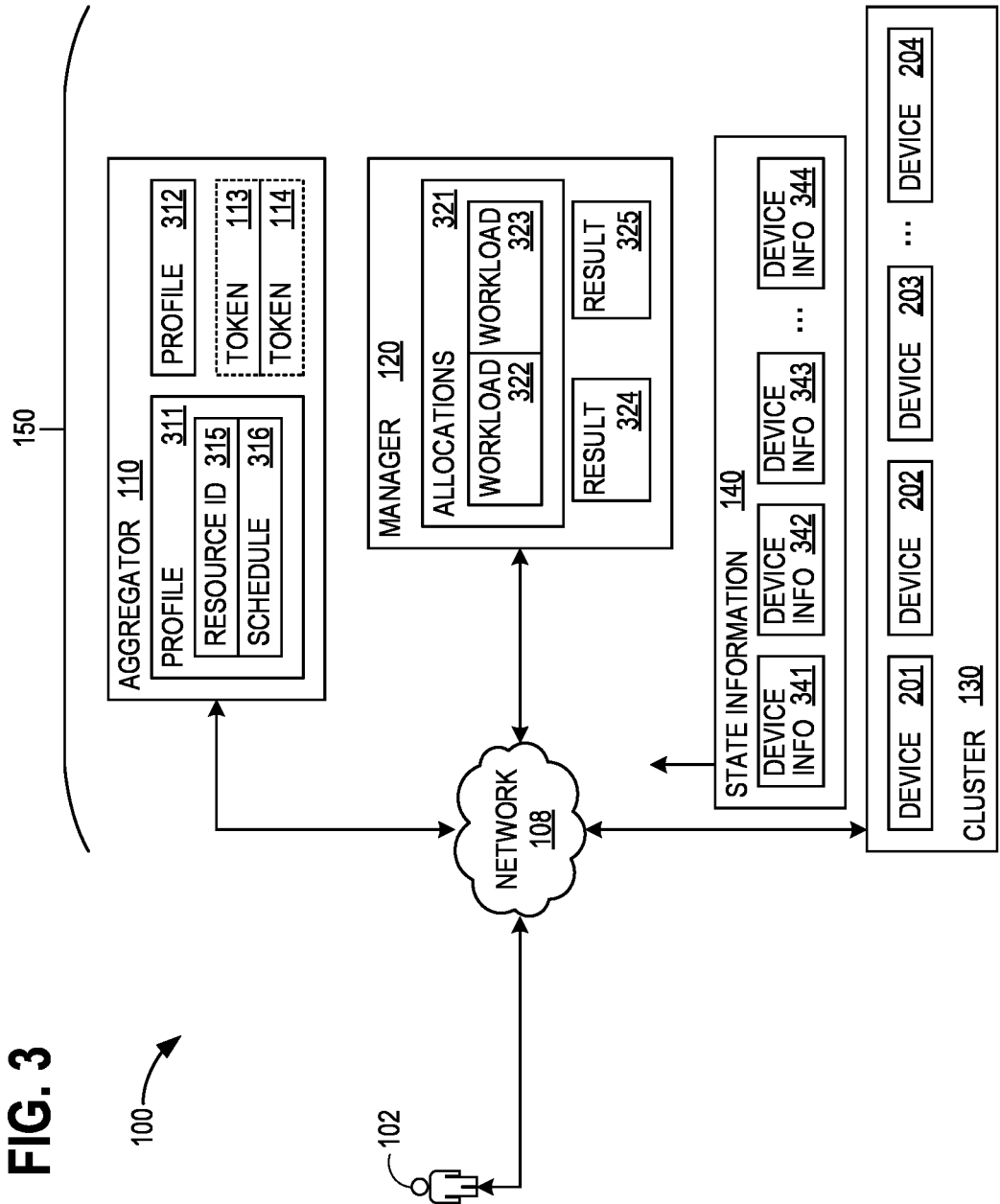
FIG. 3 illustrates changes in the example architecture of FIG. 1 that triggers further customization of edge device registrations.

FIG. 3 illustrates changes in the example architecture of FIG. 1 that triggers further customization of edge device registrations. Whereas the initial generation of device profiles 111 and 112 were performed during registration (onboarding), managing life cycle events for edge devices 201-204 is an ongoing process. Life cycle events include enabling/disabling SD-WAN node capability (compute capability), power cycles, patching and upgrades, error recovery, and teardown. A shallow teardown returns the harvested compute resources back to the SD-WAN node to run SD-WAN specific native applications, while retaining edge cloud management agents and/or other non-native software for possible later reuse. A deep teardown both returns the harvested compute resources back to the SD-WAN node to run SD-WAN specific native applications and removes edge cloud management agents and/or other non-native software.

FIG. 3 illustrates changes that happen on an ongoing basis, such as hourly, daily, or on another schedule. In some examples, if the number of edge devices is large, changes are made for only a subset of the edge devices at some update event (e.g., changes are staggered).

In FIG. 3, edge device state information 140 has changed. State information 141 for edge device 201 has changed to state information 341, state information 142 for edge device 202 has changed to state information 342, state information 143 for edge device 203 has changed to state information 343, and state information 144 for edge device 204 has changed to state information 344. These changes may be due to changes in maintenance schedule 212, primary function 210, and/or which of compute resources 230 are available, for each edge device.

As a result of changes to edge device state information 140, device aggregator 110 adjusts device profile 111 for edge device 201 to a changed device profile 311 and device profile 112 for edge device 202 to a changed device profile 312, among other possible device profile changes. For example, resource identification information 315 and/or schedule 316 may have changed. Device aggregator 110 transmits changed device profiles 311 and 312 to workload manager 120. Workload manager 120 reallocates SD-WAN workload 104 (in view of at least workload information 106 and changed device profiles 311 and 312) into new workload allocations 321. This produces a new workload 322 for edge device 201 and a new workload 323 for edge device 202, which return a result 324 and a result 325, respectively. In some examples, if SD-WAN workload 104 or workload information 106 changes, workload manager may tailor new tasks for the various edge devices 201-204 even if the device profiles remain constant.

Figure 4:
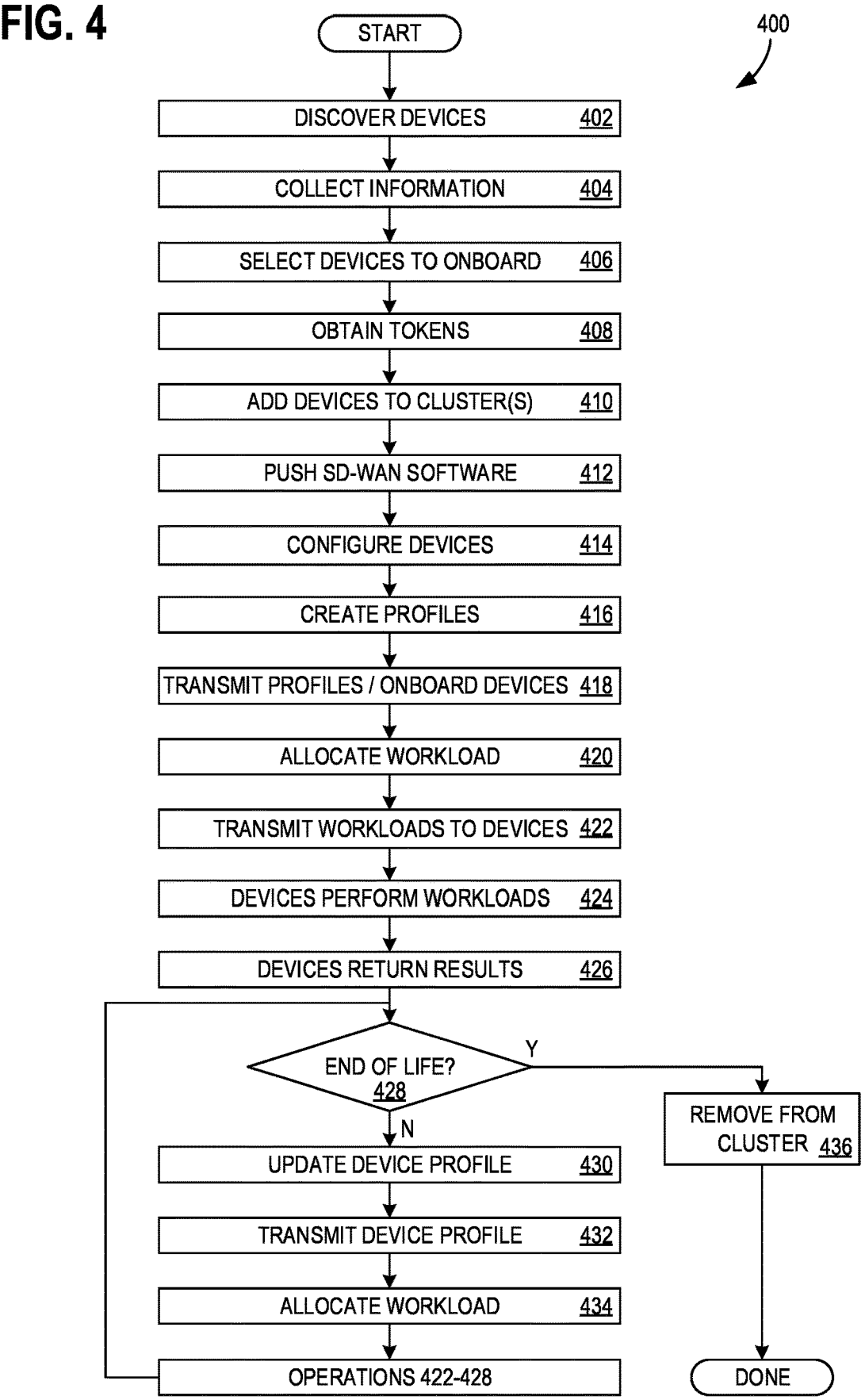
FIG. 4 illustrates a flowchart of exemplary operations associated with an example architecture, such as that of FIG. 1.

FIG. 4 illustrates a flowchart 400 of exemplary operations that may be performed by examples of architecture 100. In some examples, the operations of flowchart 400 are performed by one or more computing apparatus 618 of FIG. 6. Flowchart 400 commences with device aggregator 110 discovering edge device 201 and edge device 202 in operation 402.

In operation 404, device aggregator 110 collects the resource utilization and configuration of the edge devices, for example, using heartbeat mechanism. That is, device aggregator 110 receives edge device state information 140, over computer network 108. Edge device state information 140 includes state information 141 for edge device 201 and state information 141 for edge device 202. State information 141 and 142 includes information such as maintenance schedule 212 and information on compute resources 230. In some examples, device aggregator 110 comprises a cloud resource orchestrator and/or an SD-WAN resource orchestrator. In some examples, each of edge device 201, edge device 202, device aggregator 110, and workload manager 120 is remote across computer network 108 from each of the others.

Based on device utilization patterns, device aggregator 110 determines which edge devices are suitable for enabling edge compute along with how much compute resources each edge device can contribute, in operation 406. So for example, device aggregator 110 determines whether to onboard edge device 201 and/or edge device 202, using policy-based preconditions. As an example, device aggregator 110 may avoid onboarding an edge device that executes a VNF. As another example, device aggregator 110 may avoid onboarding an edge device whose primary function is utilizing all four cores much more than the average edge device, thereby leaving insufficient capacity to host additional workloads. In operation 408, device aggregator 110 obtains token 113 to onboard edge device 201 and obtains token 114 to onboard edge device 202.

Operation 410 adds edge device 201 and edge device 202 to computational cluster 130. In some examples, computational cluster 130 comprises an edge cloud. In operation 412, device aggregator 110 pushes a compute agent to all selected edge devices, and bootstraps the application runtime. To accomplish this, device aggregator 110 transmits (e.g., pushes) resource management software 220 to edge device 201 and edge device 202.

Device aggregator 110 configures edge device 201 and edge device 202 in operation 414 to perform as an SD-WAN nodes, based on at least state information 141 for edge device 201 and state information 142 for edge device 202. This includes configuring execution parameters 221 for resource management software 220 on edge devices 201 and 202. In operation 416, device aggregator 110 creates a device context profile that includes the context of each device. That is, based on at least edge device state information 140, device aggregator 110 determines device profile 111 for edge device 201 and device profile 112 for edge device 202. This configuration is customized. In general, device profile 112 differs from device profile 111, for example by a count or identification of compute resources to use for SD-WAN workload 104, and schedule 223 for performing as an SD-WAN node.

In operation 418, device aggregator 110 exposes the list of all devices to workload manager 120, to onboard the selected edge devices (e.g., edge devices 201 and 202) to the workload manager 120. This includes transmitting device profile 111 and device profile 112 to workload manager 120. In some examples, workload manager 120 comprises a containerized application cluster manager.

Workload manager 120 allocates SD-WAN workload 104 among edge devices, such as edge device 201 and edge device 202, based on at least device profile 111 and device profile 112, in operation 420. Based on at least allocating SD-WAN workload 104, in operation 422, workload manager 120 transmits workload 122 to edge device 201 and workload 123 to edge device 202. Edge device 201 executes workload 122 and edge device 202 executes workload 123 in operation 424, and transmit a respective one of result 124 and result 125 to workload manager 120 in operation 426. Also in operation 426, workload manager 120 reports results 124 and 125 to user 102.

A maintenance loop begins to manage the life cycles of edge devices 201 and 202 as SD-WAN nodes, using operations 428-436. Decision operation 428 determines whether an edge device is at the end of its life as a node of SD-WAN hosted workload cluster 150. If not, when there is a change in edge device state information 140 (e.g., within state information 141 or 142, device aggregator 110 changes at least one of device profile 111 and device profile 112 in operation 430. In operation 432, device aggregator 110 transmits changed device profile 311 and/or changed device profile 312 to workload manager 120. Based on at least changed device profile 311 and/or changed device profile 312, workload manager 120 allocates SD-WAN workload 104 among edge device 201 and edge device 202 in operation 434. Flowchart 400 then performs operations 422-428 within this maintenance loop.

Flowchart 400 then returns to decision operation 428. When an edge device is at its end of life, device aggregator 110 removes that edge device in operation 436, such as by removing edge device 201 and/or edge device 202 from computational cluster 130.

Figure 5:
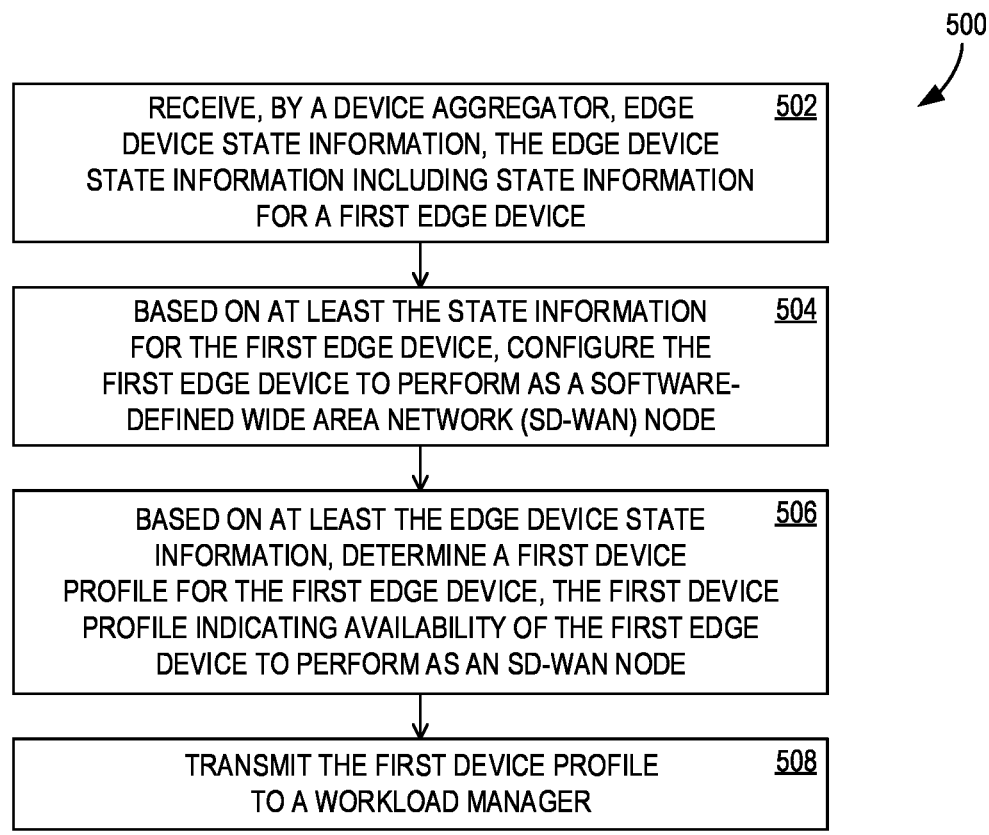
FIG. 5 illustrates an additional flowchart of exemplary operations associated with an example architecture, such as that of FIG. 1.

FIG. 5 illustrates a flowchart 500 of exemplary operations associated with architecture 100. In some examples, the operations of flowchart 500 are performed by one or more computing apparatus 618 of FIG. 6. Flowchart 500 commences with operation 502, which includes receiving, by a device aggregator, edge device state information, the edge device state information including state information for a first edge device.

Operation 504 includes, based on at least the state information for the first edge device, configuring the first edge device to perform as an SD-WAN node. Operation 506 includes, based on at least the edge device state information, determining a first device profile for the first edge device, the first device profile indicating availability of the first edge device to perform as an SD-WAN node. Operation 508 includes transmitting the first device profile to a workload manager.

Additional Examples

An example method comprises: receiving, by a device aggregator, edge device state information, the edge device state information including state information for a first edge device: based on at least the state information for the first edge device, configuring the first edge device to perform as an SD-WAN node: based on at least the edge device state information, determining a first device profile for the first edge device, the first device profile indicating availability of the first edge device to perform as an SD-WAN node; and transmitting the first device profile to a workload manager.

An example computer system comprises: a processor; and a non-transitory computer readable medium having stored thereon program code executable by the processor, the program code causing the processor to: receive, by a device aggregator, edge device state information, the edge device state information including state information for a first edge device: based on at least the state information for the first edge device, configure the first edge device to perform as an SD-WAN node: based on at least the edge device state information, determine a first device profile for the first edge device, the first device profile indicating availability of the first edge device to perform as an SD-WAN node; and transmit the first device profile to a workload manager.

An example non-transitory computer storage medium has stored thereon program code executable by a processor, the program code embodying a method comprising: receiving, by a device aggregator, edge device state information, the edge device state information including state information for a first edge device: based on at least the state information for the first edge device, configuring the first edge device to perform as an SD-WAN node: based on at least the edge device state information, determining a first device profile for the first edge device, the first device profile indicating availability of the first edge device to perform as an SD-WAN node; and transmitting the first device profile to a workload manager.

Alternatively, or in addition to the other examples described herein, examples include any combination of the following:

the edge device state information includes state information for a second edge device;
   based on at least the state information for the second edge device, configuring the second edge device to perform as an SD-WAN node;
   based on at least the edge device state information, determining a second device profile for the second edge device;
   based on at least the edge device state information and workload information, determining a first device profile for the first edge device;

the first device profile indicates availability of the first edge device to perform as an SD-WAN node;

the second device profile indicates availability of the second edge device to perform as an SD-WAN node;

based on at least the edge device state information and workload information, determining a second device profile for the second edge device;

the second device profile differs from the first device profile;

transmitting the second device profile to the workload manager;

transmitting, to the first edge device, resource management software;

configuring the first edge device comprises configuring execution parameters for the resource management software on the first edge device;

transmitting, to the second edge device, the resource management software;

configuring the second edge device comprises configuring execution parameters for the resource management software on the second edge device;

based on at least the first device profile and the second device profile, allocating, by the workload manager, an SD-WAN workload among the first edge device and the second edge device;

based on at least allocating the SD-WAN workload, transmitting, by the workload manager, to the first edge device, a first workload;

based on at least allocating the SD-WAN workload, transmitting, by the workload manager, to the second edge device, a second workload;

executing, by the first edge device, the first workload;

executing, by the second edge device, the second workload;

based on at least a change in the edge device state information, changing at least one of the first device profile and the second device profile;

transmitting the changed first device profile and/or the changed second device profile to the workload manager;

based on at least the changed first device profile and/or the changed second device profile, allocating, by the workload manager, an SD-WAN workload among the first edge device and the second edge device;

the device aggregator comprises a cloud resource orchestrator;

the device aggregator comprises an SD-WAN resource orchestrator;

the workload manager comprises a containerized application cluster manager;

the second device profile differs from the first device profile based on at least one parameter selected from the group consisting of: a count or identification of compute resources to use for an SD-WAN workload, and a schedule for performing as an SD-WAN node;

the compute resources comprise processor cores;

the compute resources comprise memory;

the compute resources comprise persistent storage;

the device aggregator configures the first edge device and the second edge device;

the device aggregator changes the first device profile and/or the second device profile;

the first edge device is remote across a computer network from the device aggregator;

the first edge device is remote across a computer network from the workload manager;

the first edge device is remote across a computer network from the second edge device;

the second edge device is remote across a computer network from the device aggregator;

the second edge device is remote across a computer network from the workload manager;

the device aggregator is remote across a computer network from the workload manager;

transmitting the resource management software comprises pushing the resource management software;

the device aggregator transmits the resource management software;

transmitting, by the first edge device, to the workload manager, a result of the first workload;

transmitting, by the second edge device, to the workload manager, a result of the second workload;

edge device state information comprises maintenance schedules;

adding the first edge device to a computational cluster;

removing the first edge device from the computational cluster;

adding the second edge device to the computational cluster;

removing the second edge device from the computational cluster;

the computational cluster comprises an edge cloud;

the second edge device differs from the first edge device based on at least processing capacity or storage capacity;

the device aggregator receives the edge device state information using a heartbeat mechanism;

the edge device state information comprises resource utilization and configuration of each edge device of a plurality of edge devices;

obtaining a token to onboard the first edge device;

obtaining a token to onboard the second edge device;

onboarding the first edge device and the second edge device with the workload manager;

determining whether to onboard the first edge device;

determining whether to onboard the second edge device; and avoiding onboarding an edge device that executes a VNF.

Exemplary Operating Environment

The present disclosure is operable with a computing device (computing apparatus) according to an embodiment shown as a functional block diagram 600 in FIG. 6. In an embodiment, components of a computing apparatus 618 may be implemented as part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hardcoded machine. Platform software comprising an operating system 620 or any other suitable platform software may be provided on the computing apparatus 618 to enable application software 621 (program code) to be executed by one or more processors 619. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 618. Non-transitory computer-readable media may include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, hard disks, RAM, ROM, EPROM, EEPROM, NVMe devices, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium (e., non-transitory) that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623). Computer storage media are tangible, non-transitory, and are mutually exclusive to communication media.

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone, or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided, such as via a dialog box or preference setting, to the users of the collection of the data (e.g., the operational metadata) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
   receiving, by a device aggregator, edge device state information, the edge device state information including state information for a first edge device;
   based on at least the state information for the first edge device, configuring the first edge device to perform as a software-defined wide area network (SD-WAN) node;
   based on at least the edge device state information, determining a first device profile for the first edge device, the first device profile indicating availability of the first edge device to perform as an SD-WAN node; and
   transmitting the first device profile to a workload manager.

2. The method of claim 1, wherein the edge device state information includes state information for a second edge device; and
   wherein the method further comprises:
      based on at least the state information for the second edge device, configuring the second edge device to perform as an SD-WAN node;
      based on at least the edge device state information, determining a second device profile for the second edge device, wherein the second device profile differs from the first device profile; and
      transmitting the second device profile to the workload manager.

3. The method of claim 2, further comprising:
   transmitting, to the first edge device, resource management software, wherein configuring the first edge device comprises configuring execution parameters for the resource management software on the first edge device; and
   transmitting, to the second edge device, the resource management software, wherein configuring the second edge device comprises configuring execution parameters for the resource management software on the second edge device.

4. The method of claim 2, further comprising:
   based on at least the first device profile and the second device profile, allocating, by the workload manager, an SD-WAN workload among the first edge device and the second edge device.

5. The method of claim 4, further comprising:
   based on at least allocating the SD-WAN workload, transmitting, by the workload manager, to the first edge device, a first workload;
   based on at least allocating the SD-WAN workload, transmitting, by the workload manager, to the second edge device, a second workload;
   executing, by the first edge device, the first workload; and
   executing, by the second edge device, the second workload.

6. The method of claim 2, further comprising:
   based on at least a change in the edge device state information, changing at least one of the first device profile and the second device profile; and
   transmitting the changed first device profile and/or the changed second device profile to the workload manager.

7. The method of claim 6, further comprising:
   based on at least the changed first device profile and/or the changed second device profile, allocating, by the workload manager, an SD-WAN workload among the first edge device and the second edge device.

8. A computer system comprising:
   a processor; and
   a non-transitory computer readable medium having stored thereon program code executable by the processor, the program code causing the processor to:
      receive, by a device aggregator, edge device state information, the edge device state information including state information for a first edge device;
      based on at least the state information for the first edge device, configure the first edge device to perform as a software-defined wide area network (SD-WAN) node;
      based on at least the edge device state information, determine a first device profile for the first edge device, the first device profile indicating availability of the first edge device to perform as an SD-WAN node; and
      transmit the first device profile to a workload manager.

9. The computer system of claim 8, wherein the edge device state information includes state information for a second edge device; and
   wherein the program code is further operative to:
      based on at least the state information for the second edge device, configure the second edge device to perform as an SD-WAN node;
      based on at least the edge device state information, determine a second device profile for the second edge device, wherein the second device profile differs from the first device profile; and
      transmit the second device profile to the workload manager.

10. The computer system of claim 9, wherein the program code is further operative to:
    transmit, to the first edge device, resource management software, wherein configuring the first edge device comprises configuring execution parameters for the resource management software on the first edge device; and transmit, to the second edge device, the resource management software, wherein configuring the second edge device comprises configuring execution parameters for the resource management software on the second edge device.

11. The computer system of claim 9, wherein the program code is further operative to:
based on at least the first device profile and the second device profile, allocate, by the workload manager, an SD-WAN workload among the first edge device and the second edge device.

12. The computer system of claim 11, wherein the program code is further operative to:
based on at least allocating the SD-WAN workload, transmit, by the workload manager, to the first edge device, a first workload;
based on at least allocating the SD-WAN workload, transmit, by the workload manager, to the second edge device, a second workload;
execute, by the first edge device, the first workload; and
execute, by the second edge device, the second workload.

13. The computer system of claim 9, wherein the program code is further operative to:
based on at least a change in the edge device state information, change at least one of the first device profile and the second device profile; and
transmit the changed first device profile and/or the changed second device profile to the workload manager.

14. The computer system of claim 13, wherein the program code is further operative to:
based on at least the changed first device profile and/or the changed second device profile, allocate, by the workload manager, an SD-WAN workload among the first edge device and the second edge device.

15. A non-transitory computer storage medium having stored thereon program code executable by a processor, the program code embodying a method comprising:
receiving, by a device aggregator, edge device state information, the edge device state information including state information for a first edge device;
based on at least the state information for the first edge device, configuring the first edge device to perform as a software-defined wide area network (SD-WAN) node;
based on at least the edge device state information, determining a first device profile for the first edge device, the first device profile indicating availability of the first edge device to perform as an SD-WAN node; and
transmitting the first device profile to a workload manager.

16. The computer storage medium of claim 15, wherein the edge device state information includes state information for a second edge device; and
wherein the program code method further comprises:
based on at least the state information for the second edge device, configuring the second edge device to perform as an SD-WAN node;
based on at least the edge device state information, determining a second device profile for the second edge device, wherein the second device profile differs from the first device profile; and
transmitting the second device profile to the workload manager.

17. The computer storage medium of claim 16, wherein the program code method further comprises:
transmitting, to the first edge device, resource management software, wherein configuring the first edge device comprises configuring execution parameters for the resource management software on the first edge device; and
transmitting, to the second edge device, the resource management software, wherein configuring the second edge device comprises configuring execution parameters for the resource management software on the second edge device.

18. The computer storage medium of claim 16, wherein the program code method further comprises:
based on at least the first device profile and the second device profile, allocating, by the workload manager, an SD-WAN workload among the first edge device and the second edge device.

19. The computer storage medium of claim 18, wherein the program code method further comprises:
based on at least allocating the SD-WAN workload, transmitting, by the workload manager, to the first edge device, a first workload;
based on at least allocating the SD-WAN workload, transmitting, by the workload manager, to the second edge device, a second workload;
executing, by the first edge device, the first workload; and
executing, by the second edge device, the second workload.

20. The computer storage medium of claim 16, wherein the program code method further comprises:
based on at least a change in the edge device state information, changing at least one of the first device profile and the second device profile;
transmitting the changed first device profile and/or the changed second device profile to the workload manager; and
based on at least the changed first device profile and/or the changed second device profile, allocating, by the workload manager, an SD-WAN workload among the first edge device and the second edge device.

* * * * *